United States Patent [19]
Montgomery

[11] Patent Number: 5,521,628
[45] Date of Patent: May 28, 1996

[54] LASER SYSTEM FOR SIMULTANEOUSLY MARKING MULTIPLE PARTS

[75] Inventor: John Montgomery, Stittsville, Canada

[73] Assignee: Lumonics Corporation, Oxnard, Calif.

[21] Appl. No.: 113,977

[22] Filed: Aug. 30, 1993

[51] Int. Cl.⁶ .................................................. B41J 15/16
[52] U.S. Cl. ....................................................... 347/243
[58] Field of Search ............................ 346/108, 107 R, 346/76 L, 160, 1.1; 250/548; 347/134, 239, 241, 243

[56] References Cited

U.S. PATENT DOCUMENTS 5,119,454  6/1992  McMahon ................................. 385/49
5,138,176  8/1992  Nishi ....................................... 250/548
5,386,221  1/1995  Allen et al. ............................. 347/239

*Primary Examiner*—Mark J. Reinhart
*Attorney, Agent, or Firm*—Freilich Hornbaker Rosen

[57] ABSTRACT

Laser marking systems (60, 80, 160, 250) having increased part throughput are obtained by disposing diffractive optics (70, 70A, 94, 170, 252) across a primary laser beam. Preferred diffractive optics for high power marking lasers are defined in optical materials with discrete surface levels.

17 Claims, 7 Drawing Sheets

LASER SYSTEM FOR SIMULTANEOUSLY MARKING MULTIPLE PARTS

BACKGROUND OF THE INVENTION

This invention relates to laser marking systems of the type which are widely used to mark various industrial parts with information such as part numbers, lot numbers, manufacturers' names, etc. Such marking systems typically fall into two categories; namely, focused spot systems and mask systems.

In a focused spot system, e.g., a commercially available Lumonics LightWriter product, a laser beam (typically a YAG or Continuous Wave $CO_2$ beam) is steered toward a part (i.e., work surface) through a focusing optic by computer controlled x and y galvanometer mounted mirrors. The focusing optic establishes the laser spot diameter for power density, working clearance (focal length and depth of focus), and marking field (work area). Computer control of the mirror movement enables adjustment of character style, size, shape, writing speed and location in the marking field. For metal marking and most other non-transparent marking applications, a YAG laser is generally used. In its Q-switched mode, a focused spot laser can produce several thousand watts of peak power for engraving hard material such as steel. For many transparent materials and other non-metal marking applications, a CW $CO_2$ laser provides an alternative to YAG focused spot marking.

In a mask system, e.g., a commercially available Lumonics LaserMark product, an interchangeable copper mask or "light stencil" containing the information to be marked is placed in the laser beam path. A TEA $CO_2$ is typically used to provide enough pulse energy to selectively remove or alter a thin layer of material on the work surface. Using mirrors, the laser beam is directed through the mask and a focusing optic. The focusing optic concentrates laser energy to an effective level for marking. In this manner, a complete message can be "fired" onto the workpiece in a single pulse having a duration on the order of one microsecond. Mask marking systems are most commonly used for non-metal marking applications requiring very high throughput with infrequent code changes.

Such commercially available laser marking systems are typically used with a conveyor which serially delivers parts to a marking station where they are sequentially marked one part at a time.

The present invention is directed to a system for increasing marking throughput by splitting a primary laser beam into multiple secondary laser beams for simultaneously marking multiple workpieces.

U.S. Patents directed to beam splitting optical systems include U.S. Pat. Nos. 3,617,702; 3,763,441; 3,767,310; 4,257,673; 4,670,639; 4,970,369; 5,003,550; 5,089,903; 5,112,121; 5,115,444; 5,136,424; 5,166,818; and 5,177,750.

SUMMARY OF THE INVENTION

Marking systems in accordance with the invention are characterized by a high power: laser (i.e.,>1 W output power) for producing a primary laser beam and a beam splitting optic disposed across the laser beam path to split the primary beam into a plurality of spaced secondary beams each having sufficient power to mark a work area.

A preferred beam splitting optic includes a diffractive grating structure fabricated in a material having a damage threshold exceeding the primary laser beam power density at the beam splitting optic location by a process which forms discrete surface levels in the material to approximate an idealized diffraction profile.

In a preferred focused spot embodiment, the primary beam is modulated by marking information, e.g., by steered galvanometer mounted mirrors, prior to splitting into multiple secondary beams, each of which is then steered along a different work area to mark a pattern described by the marking information. In another preferred focused spot embodiment, the primary beam is split into multiple secondary beams prior to modulating the multiple secondary beams with marking information.

In a preferred mask embodiment, marking information is modulated onto the primary laser beam by disposing a mask, carrying a defined pattern, across the primary laser beam, prior to splitting into multiple secondary beams.

The novel features of the invention are set forth with particularity in the appended claims. The invention will be best understood from the following description when read in conjunction with the accompanying drawings.

DESCRIPTION OF PREFERRED EMBODIMENTS

Figure 1:
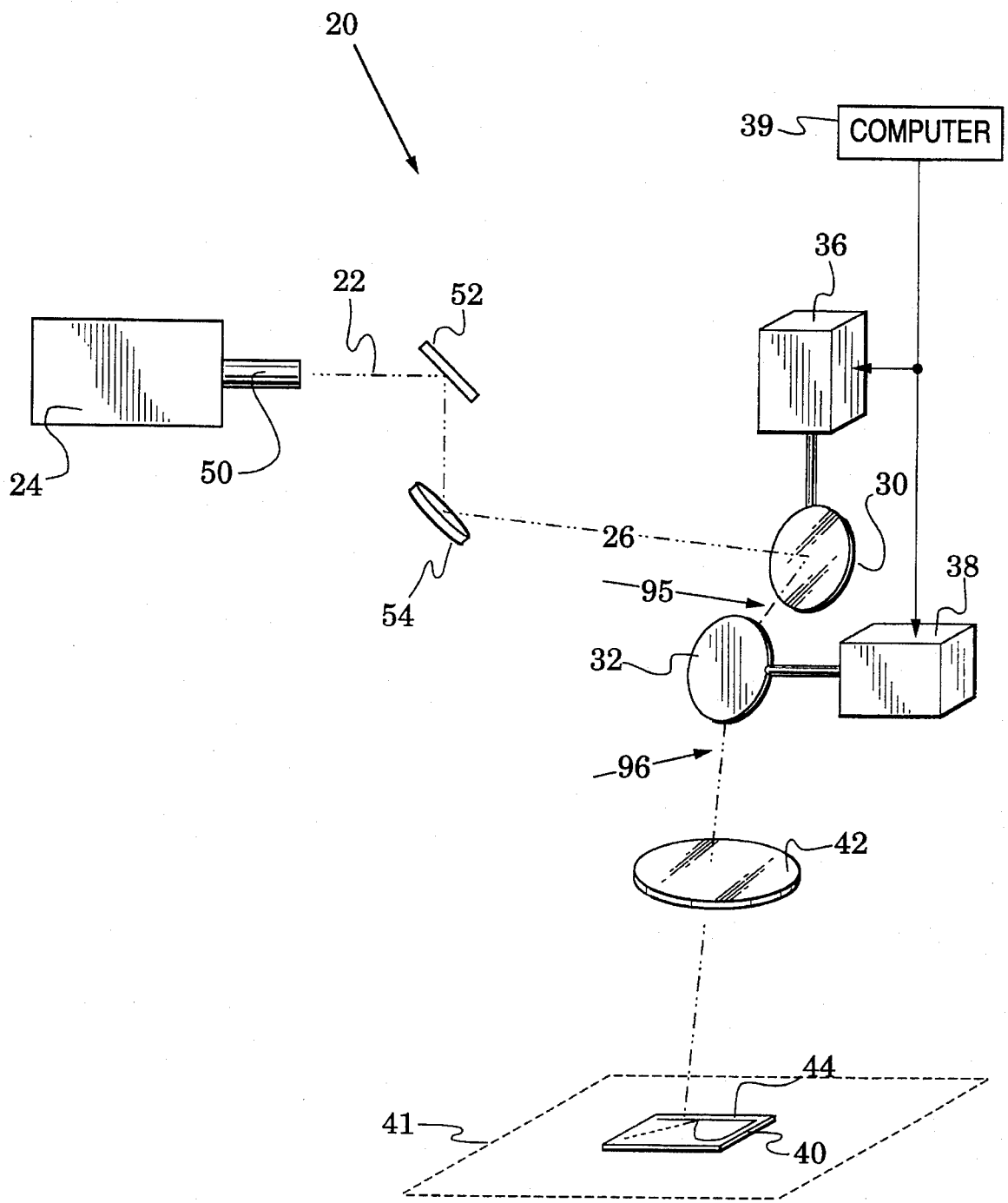
FIG. 1 is a schematic diagram of a typical focused spot laser marking system.

A typical prior art focused spot marking system 20 is schematically illustrated in FIG. 1 where a laser beam 22, generated by a high power laser 24 (>1 W output power), describes a laser beam path 26 which includes reflections from a pair of steering mirrors 30, 32. The steering mirrors are each responsive (usually along x, y coordinates) to one of a pair of galvanometers 36, 38 which are generally controlled by a computer 39. The laser beam 22 is focused onto a focal plane 41 by a focusing optic 42 which establishes the laser spot diameter and focal plane area while also providing working clearance from the workpiece 40.

The desired marking information is modulated onto the laser beam by steering it along a defined pattern 44, e.g. the letter R, to correspondingly mark the workpiece 40. In FIG. 1, the broken line portion of the pattern 44 indicates the remaining pattern to be marked. When the desired pattern 44 is complete on one workpiece 40, a successive workpiece 40 may be moved onto the focal plane 41 for marking. The throughput of marked parts in a given time period, therefore, is limited to that time period divided by the pattern generation time.

As shown in FIG. 1, focused spot marking systems often include a beam expander and collimator 50, which controls the area and, hence, the power density of the laser beam 22, and adjustable turning mirrors 52, 54 to facilitate alignment between the laser 24 and the system optics.

In the system 20, the marking information may also be modulated onto the laser beam 22 by controlling, with the steering mirrors 30, 32, the beam 22 in a raster pattern while turning the laser beam on and off, e.g., with a Q-switch in the laser 24.

Figure 2:
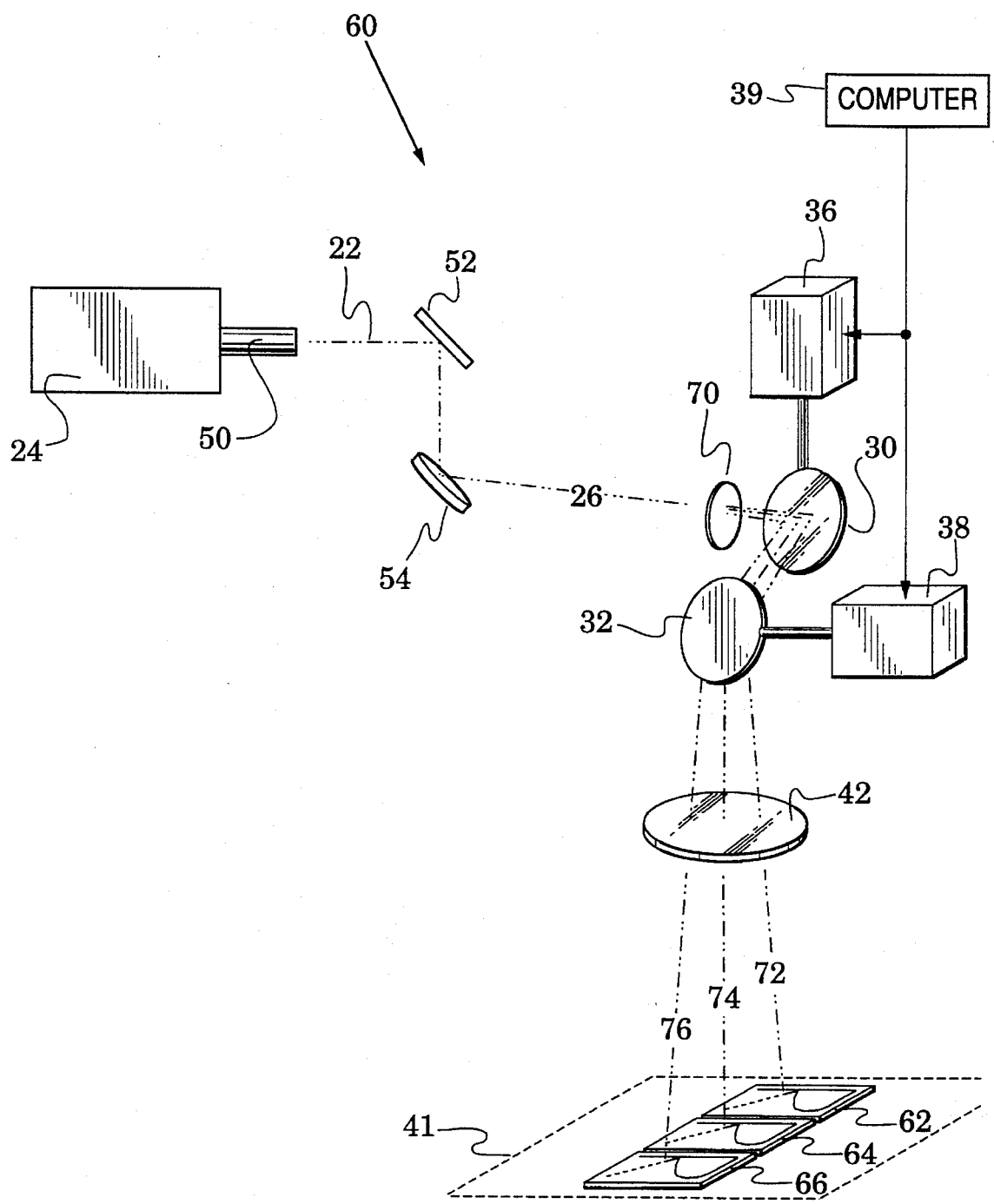
FIG. 2 is a schematic diagram of a preferred focused spot laser marking system embodiment in accordance with the present invention.

In accordance with the present invention, FIG. 2 illustrates a preferred embodiment 60 of a focused spot marking system having a greater throughput than the prior art of FIG. 1 because it simultaneously marks a plurality of workpieces 62, 64, 66 in the same pattern generation time required to mark one workpiece 40 in the system 20. The increased throughput is obtained by the use of a beam splitting optic, such as the diffractive grating structure 70, disposed across the laser beam path 26 to divide the primary laser beam 22 into multiple spaced secondary laser beams 72, 74, 76 which are simultaneously responsive to the steering mirrors 30, 32. The secondary laser beams 72, 74, 76 are thus simultaneously steered over the workpieces 62, 64, 66.

Figure 3:
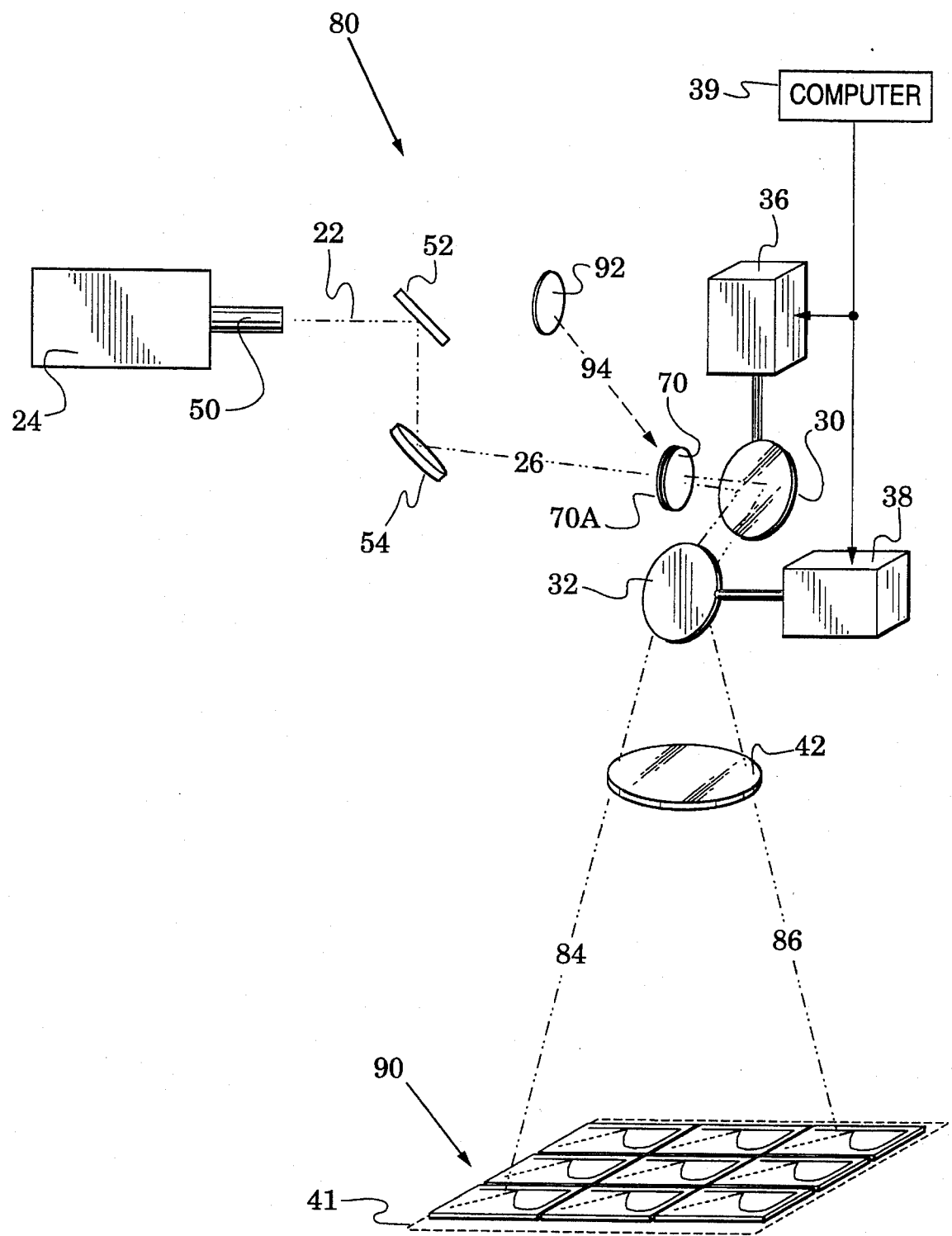
FIG. 3 is a schematic diagram of another preferred focused spot laser marking system embodiment.

In FIG. 3, a second diffractive grating structure 70A has been combined with the diffractive grating structure 70 to produce another preferred focused spot marking system 80 which also has a throughput greater than the prior art of FIG. 1. The diffractive grating structure 70A is similar to the structure 70 but is rotated substantially ninety degrees therefrom. Therefore, each of the secondary laser beams 72, 74, 76 of FIG. 2 is diffracted into three spaced laser beams along a plane rotated ninety degrees from the plane containing the laser beams 72, 74, 76 to create a total of nine secondary laser beams. For clarity of illustration, only two of these secondary laser beams 84, 86 are shown in the process of marking the nine workpieces 90.

In FIG. 2, the grating lines of the grating structures 70, 70A can be replaced, as indicated by the arrow 94, with a single preferred grating structure 92 which incorporates orthogonal grating lines. Obviously, the teachings of the invention may be extended in this way to the simultaneous marking of n workpieces. It should be apparent to those skilled in the art that the restraints of illustration exaggerate the spatial separation of secondary laser beams in FIGS. 2 and 3.

In the systems 60, 80 of FIGS. 2, 3, the diffractive grating structures 70, 70A, 92 have been disposed across the laser beam path 26 upstream (towards the laser 24) from the steering mirrors 30, 32. The grating structures may be placed virtually anywhere across the laser beam path 26 but other preferred locations are between the steering mirrors 30, 32 and downstream (towards the workpiece) from the steering mirrors 30, 32 as respectively indicated by the arrows 95, 96 in FIG. 1. Preferably the diffractive grating structures are located to place the secondary laser beams within the Numerical Aperture of the optical system.

Considerable laser beam power is typically required for marking applications, e.g., the laser power density may exceed 1 KW/square centimeter in the vicinity of the steering mirrors 30, 32 of FIG. 1 in order to produce the required intensity at the focal plane 41. Systems in accordance with the invention, e.g., systems 60, 80 shown in FIGS. 2, 3, form each secondary laser beam from a primary beam 22 whose power density, therefore, must be greater by a factor of n where n is the number of secondary beams (assuming the power density of each secondary laser beam is substantially equal).

Conventional beam splitting optics often include components, e.g., epoxy resins, coatings, having a damage threshold below such high power densities. However, a preferred beam splitting optic, suitable for realizing the present invention, may be formed with processes similar to those used in fabrication of electronic integrated circuits. These processes, which produce optical parts often known as binary optics, are described in the following references, the disclosures of which are hereby incorporated by reference: Fars, Michael, et al. "The Making of Binary Optics", Optics and Photonics News, May 1991, pp. 20–22; Kathman, Alan, et al. "Binary Optics", Photonics Spectra, September 1992, pp. 125–132; Goltsos, William, et al., "Binary Micro Optics", SPIE Vol. 1052 Holographic Optics (1989), pp. 131–141; Goltsos, William, et al. "Agile Beam Steering", Optical Engineering, November 1990, pp. 1392–1397; Cordingley, J. "Application of a Binary Optic", Applied Optics, 10 May 1993, pp. 2529–2542; Rastani, Kasra, "Binary Phase Fresnel Lenses" Applied Optics, 10 Apr. 1991, pp. 1347–1354 and Patt, Paul, "Binary Phase Gratings for Materials Processing", Journal of Laser Applications, Spring 1990.

Figure 4:
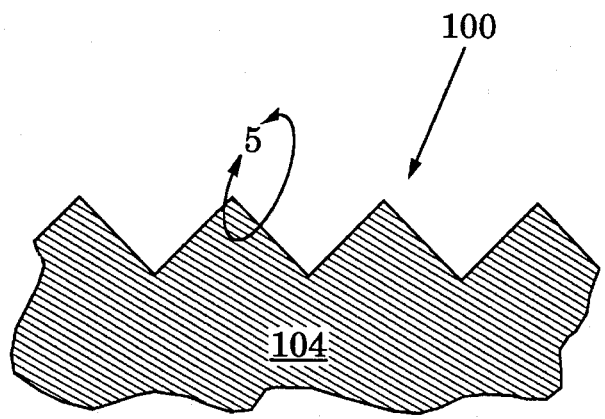
FIG. 4 illustrates a profile portion of an exemplary diffraction grating structure.
Figure 5:
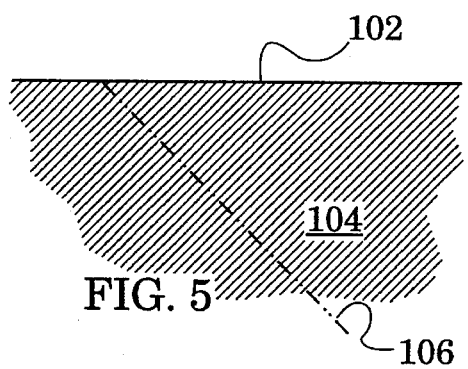
FIG. 5 is a cross section of an optical material showing an original surface and a desired surface in accordance with the profile within the curved line 5 of FIG. 4.
Figures 6A, 6B, 6C:
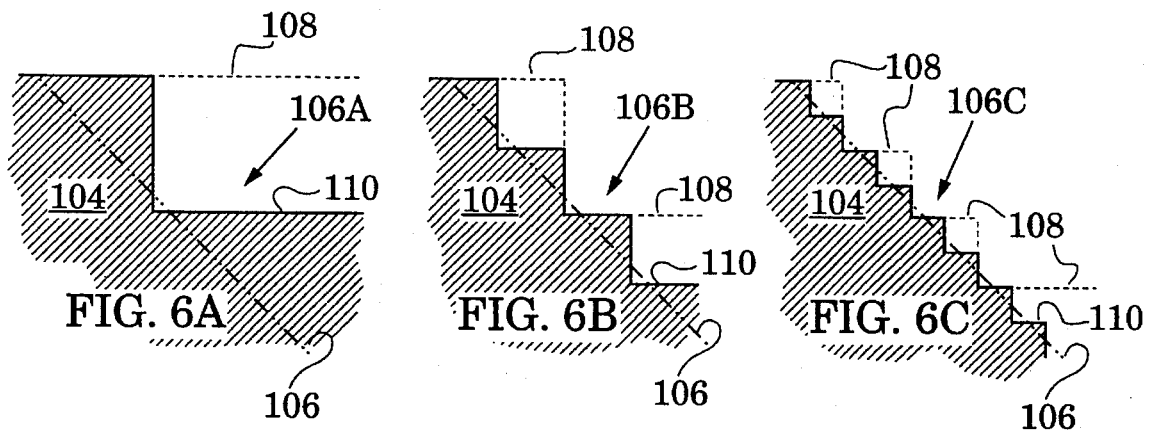
FIG. 6A illustrates a first removal of optical material to approach the desired surface of FIG. 5.
FIG. 6B illustrates a second removal of optical material to approach the desired surface of FIG. 5.
FIG. 6C illustrates a third removal of optical material to approach the desired surface of FIG. 5.

Accordingly, a process for fabricating a preferred diffraction grating structure (70 in FIG. 2), in accordance with the present invention, is illustrated in FIGS. 4–6. A first process step is the selection of a material, e.g., fused silica, having a damage threshold exceeding the power density of the primary laser beam at the location along the laser beam path (26 in FIG. 1) chosen for the diffraction grating structure. Using teachings well known in the optical art, an idealized diffractive profile is mathematically developed which night result in the exemplary profile portion 100 of FIG. 4. From this idealized profile, a series of precise microlithographic masks are developed with the aid of a computer.

The surface of the chosen material (104 in FIG. 4) is then coated with photoresist and areas of the photoresist removed (typically with ultraviolet light) in accordance with the masks. The exposed optical surface is lowered with a process such as ion milling or plasma etching. These steps are repeated to produce a multilevel relief structure that approaches the idealized goal.

For example, FIG. 5 shows an original surface 102 of the optical material 104 and an ideal design surface 106 in accordance with the contour within the curved line 5 of FIG. 4. A first removal of material in accordance with a first microlithographic mask produces the contour 106A shown in FIG. 6A. The broken line 108 indicates the extent of the removed material. Second and third material removals in accordance with second and third microlithographic masks produces the contours 106B and 106C shown respectively in FIGS. 6B and 6C. It is apparent that each mask produces a contour that is closer to the ideal design surface 106 and that the number of discrete surface levels 110 produced by the fabrication process doubles with the application of each mask.

Other processes for forming a beam splitting optic suitable for realizing the present invention are described in the following reference, the disclosure of which are hereby incorporated by reference: Langlois, P., et al., "Diffractive Optical Elements Fabricated by Laser Direct Writing and Other Techniques", SPIE Vol. 1751 Minature and Micro-Optics (1992).

Figure 7:
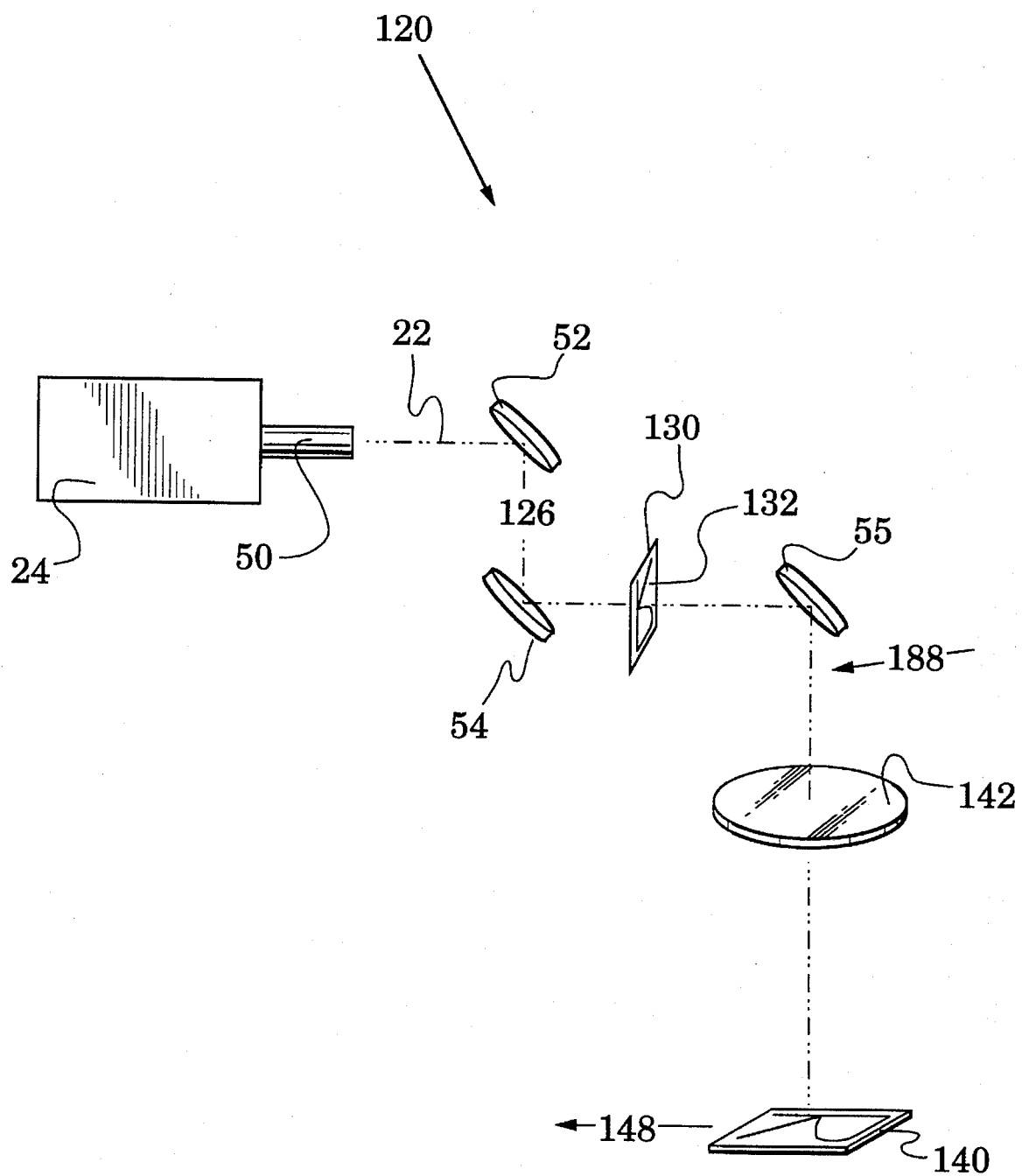
FIG. 7 is a schematic diagram of a typical mask laser marking system.

The teachings of the invention may be extended to other typical laser marking systems such as the mask marking system 120 illustrated in FIG. 7. In mask marking systems, the laser beam 22 is directed along a laser beam path 126 by adjustable turning mirrors 52, 54, 55. The desired marking information is modulated onto the laser beam by disposing a mask 130 across the beam path 126 with a pattern 132, e.g., the letter R, defined in the mask 130 to form a stencil through which the laser beam 22 is directed and shaped. An image of the pattern 132 is formed on the workpiece 140 by a focusing optic 142. As workpieces 140 move along a path indicated by the arrow 148, they are marked by a single laser pulse through the mask 130 (for large masks, more than one pulse may be required).

Figure 8:
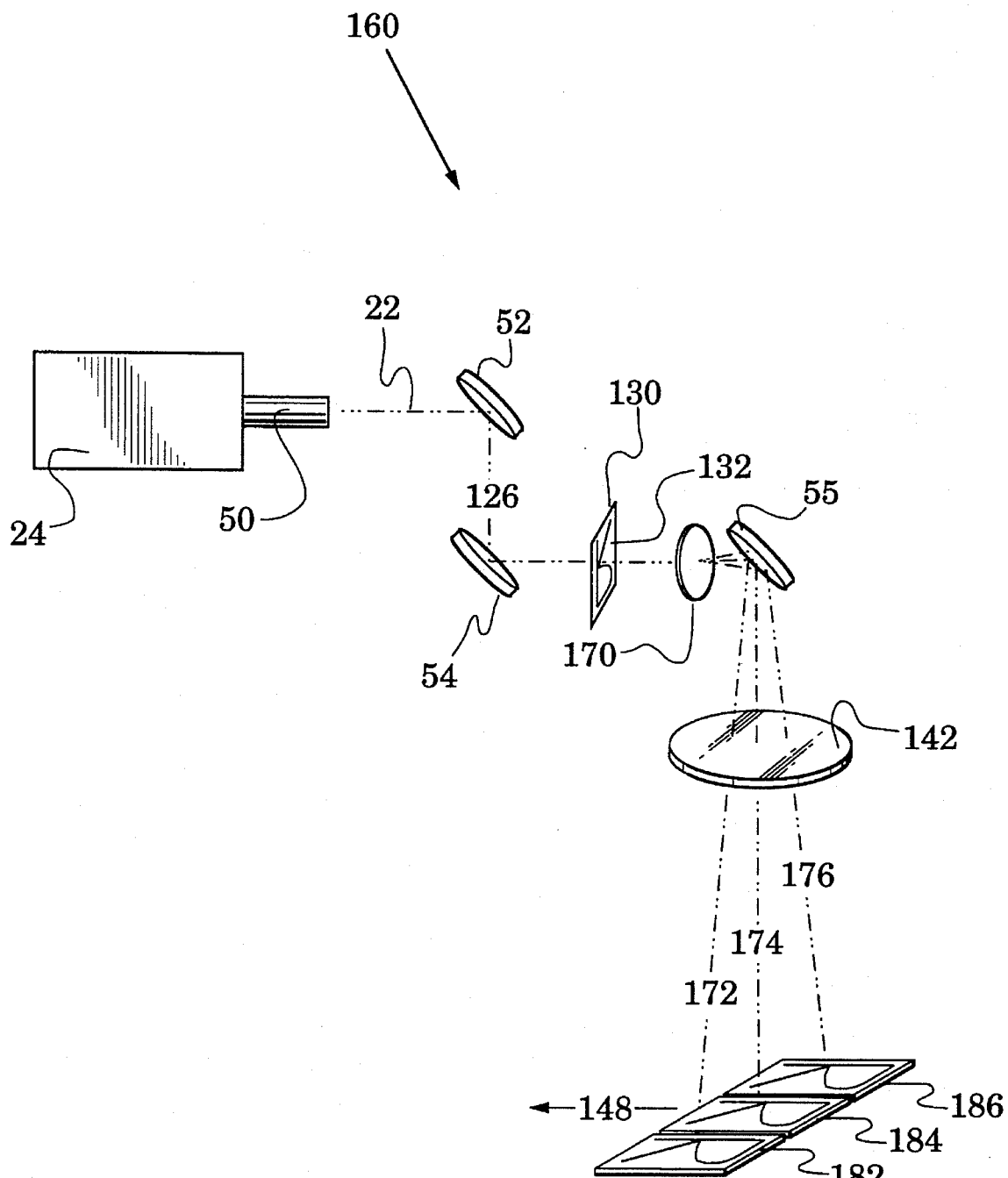
FIG. 8 is a schematic diagram of a preferred mask laser marking system embodiment in accordance with the present invention.

In accordance with the teachings of the invention, a mask marking system 160 with a higher throughput is obtained by disposing a diffractive grating structure 170 across the laser beam path 126 as shown in FIG. 8. In the system 160, the laser beam 22 is diffracted into three spaced secondary laser beams 172, 174, 176 to simultaneously mark workpieces 182, 184, 186 in the same time required to mark one workpiece 140 in FIG. 7. Another preferred location for disposing the diffractive grating structure across the laser beam path 126 is downstream from the turning mirror 55 as indicated by the arrow 188 in FIG. 7.

Figure 9:
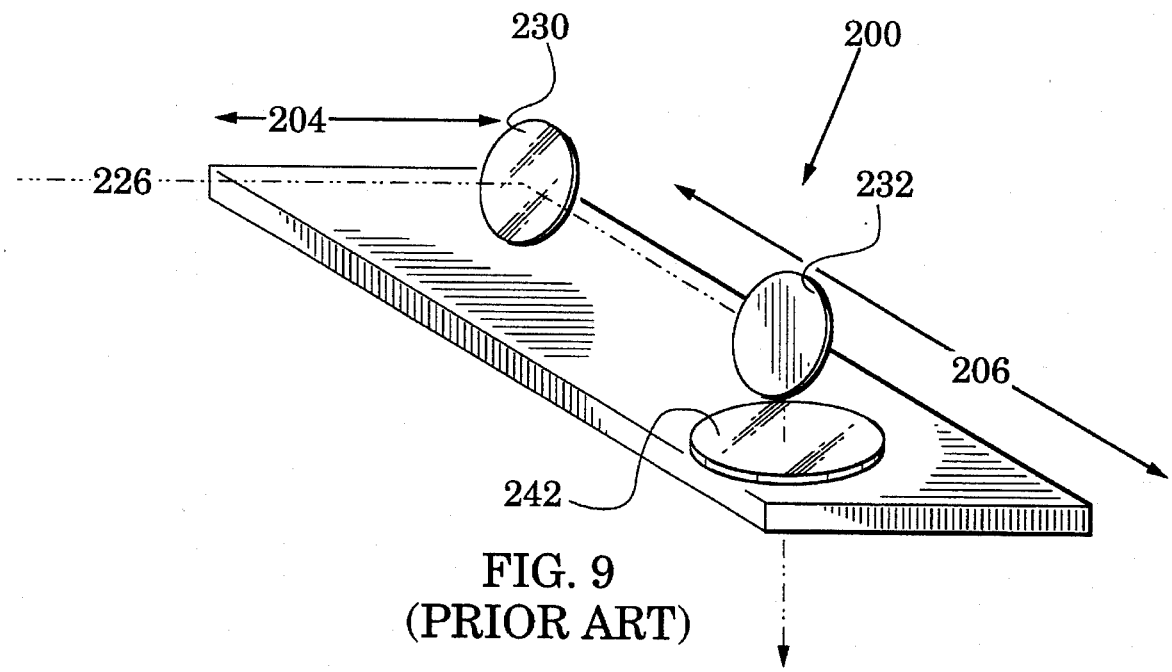
FIG. 9 is a schematic diagram of a portion of a typical moving optic marking system.

A moving optic laser marking system is similar to the focused spot marking system 20 of FIG. 1 but differs in that the steering mirrors 230, 232 and focusing optic 242 are fixed to an optical head 200 as shown in FIG. 9 to direct the laser beam along a laser beam path 226. Therefore, the rotation of the steering mirrors by computer controlled galvanometers 36, 38 in the system 20 is replaced by computer controlled translation of the optical head 200 along x-y directions as indicated by the arrows 204, 206.

Figure 10:
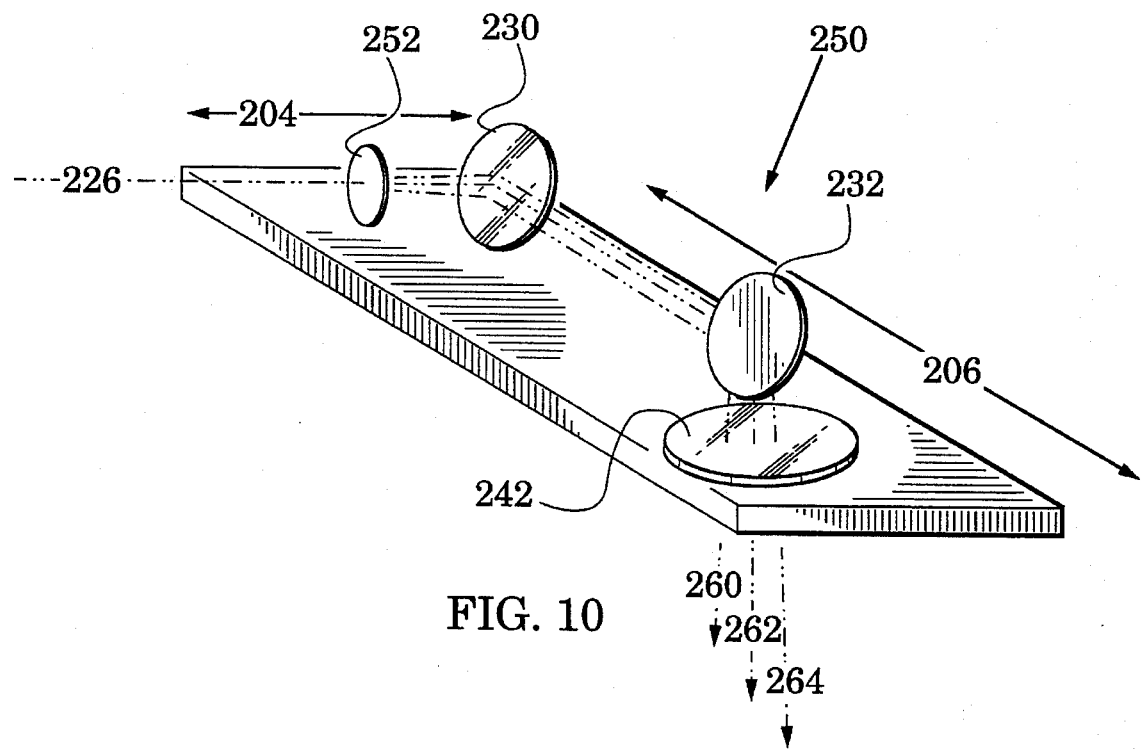
FIG. 10 is a schematic diagram of a portion of a preferred moving optic laser marking system embodiment in accordance with the present invention.

An optical head 250 for an increased throughput simultaneous marking system, in accordance with the present invention, can be formed by disposing a diffractive grating structure 252 across the laser beam path 226 and upstream from the focusing optic 242 as shown in FIG. 10. Preferably, the grating structure is carried on the optical head 250, e.g., ahead of the steering mirror 230, to diffract the laser beam into the diffracted beams 260, 262 and 264. If placed downstream from the optical head 250, the diffracted beams would travel varying distances, as the moving optic translates along the x, y directions, which would cause their spatial separation at the workpieces to vary.

Preferred embodiments of the invention have been described above in the process of producing a single mark on each of a plurality of workpieces. Other applications of the embodiments may include marking a plurality of work areas on each workpiece, e.g., along a ribbon cable. The term work area shall, therefore, be used herein to refer to a single marking location, whether it be one of a plurality of work areas on a single workpiece, a single area on each of a plurality of workpieces or one of a plurality of work areas on a plurality of workpieces.

The preferred embodiments shown above form secondary laser beams for simultaneously marking a plurality of work areas. It should be understood that the power of these secondary laser beams may or may not be substantially equal. Some applications of the invention, e.g., marking of dissimilar materials, may require secondary laser beams having different power levels. Thus the fabrication of beam splitting optics for realizing the invention may be in accordance with designs that produce substantially equal intensity secondary laser beams as well as designs that produce different intensity secondary laser beams.

From the foregoing it should now be recognized that laser marking system embodiments have been disclosed herein especially suited to increase the throughput of prior art systems. The preferred embodiments of the invention described herein are exemplary and numerous modifications and rearrangements can be readily envisioned to achieve an equivalent result, all of which are intended to be embraced within the scope of the appended claims.

What is claimed is:

1. A system for concurrently marking an identical two dimensional pattern on each of multiple work areas, said system comprising:

a high power laser providing a primary laser beam;

beam splitter means for optically splitting said primary laser beam into multiple spatially displaced non-parallel secondary laser beams;

a common modulating means for causing all of said secondary laser beams to simultaneously describe identical two dimensional patterns; and optical means for directing each of said secondary laser beams onto a different one of said work areas to mark said two dimensional pattern thereon.

2. The system of claim 1, wherein said common modulating means modulates said primary laser beam to form a modulated primary laser beam before splitting said modulated primary laser beam with said beam splitter means.

3. The system of claim 1, wherein said common modulating means concurrently modulates said secondary laser beams to form a plurality of modulated secondary laser beams following splitting said primary laser beam with said beam splitter means.

4. The system of claim 1 wherein said common modulating means includes means for concurrently steering each of said secondary laser beams along said pattern and disposed for concurrently producing a plurality of copies of said pattern.

5. The system of claim 1 wherein said modulating means includes a stencil carrying said pattern and disposed for concurrently producing a plurality of copies of said pattern.

6. The system of claim 1 wherein said beam splitter means comprises a diffractive grating structure.

7. The system of claim 6 wherein said diffractive grating structure is formed of fused silica having a plurality of discrete surface levels.

8. The system of claim 1 wherein the damage threshold of said beam splitter means exceeds 1 KW/square centimeter.

9. A method for concurrently marking an identical two dimensional pattern on each of a plurality of work areas, comprising the steps of:

generating a primary high power laser beam;

splitting said primary laser beam into a plurality of non-parallel secondary laser beams;

commonly modulating at least one of said laser beams to cause said secondary laser beams to simultaneously describe identical two dimensional patterns; and directing each of said secondary laser beams onto a different one of said work areas to mark said two dimensional pattern thereon.

10. The method of claim 9, wherein said modulating step precedes said splitting step.

11. The method of claim 9, wherein said splitting step precedes said modulating step.

12. The method of claim 9, wherein said modulating step includes the step of steering each of said secondary laser beams along said pattern.

13. The method of claim 9, wherein said modulating step includes the step of forming said pattern using a stencil disposed across said primary laser beam.

14. The method of claim 9, wherein said modulating step includes the step of forming said pattern using a stencil disposed across said secondary laser beams.

15. The method of claim 9, wherein said splitting step includes the steps of:

defining a diffractive grating structure in an optical material with a plurality of discrete surface levels; and disposing said grating structure across said primary laser beam.

16. The method of claim 15, wherein said defining step includes selecting said diffractive grating structure having a damage threshold exceeding 1 KW/square centimeter.

17. The method of claim 9, further comprising the step of focusing each of said secondary laser beams onto a different one of said work areas.

* * * * *